United States Patent
Min et al.

(10) Patent No.: US 10,891,196 B2
(45) Date of Patent: Jan. 12, 2021

(54) APPARATUS AND METHOD FOR CONTENTS BACK-UP IN HOME NETWORK SYSTEM

(71) Applicant: Samsung Electronics Co., Ltd., Suwon-si (KR)

(72) Inventors: Hyun-Suk Min, Suwon-si (KR); Ji-Hyeon Kweon, Yongin-si (KR); Kwan-Woo Song, Yongin-si (KR); Kyung-Jae Kim, Suwon-si (KR); Jin-Choul Lee, Suwon-si (KR); Kyu-Hyung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 14/107,501

(22) Filed: Dec. 16, 2013

(65) Prior Publication Data
US 2014/0181012 A1  Jun. 26, 2014

(30) Foreign Application Priority Data

Dec. 14, 2012 (KR) .................. 10-2012-0145962
Oct. 29, 2013 (KR) .................. 10-2013-0129405

(51) Int. Cl.
*G06F 11/14* (2006.01)
*H04W 4/80* (2018.01)
*G06F 16/27* (2019.01)
*H04W 4/029* (2018.01)
*H04L 29/08* (2006.01)
(Continued)

(52) U.S. Cl.
CPC .......... *G06F 11/1464* (2013.01); *G06F 16/27* (2019.01); *H04L 12/2812* (2013.01); *H04L 67/1095* (2013.01); *H04W 4/029* (2018.02); *H04W 4/80* (2018.02); *H04W 12/02* (2013.01);
(Continued)

(58) Field of Classification Search
CPC combination set(s) only.
See application file for complete search history.

(56) References Cited

U.S. PATENT DOCUMENTS 6,064,880 A * 5/2000 Alanara ................ H04W 8/205
455/419
6,975,854 B1 * 12/2005 Kee .................. H04M 1/274516
455/412.1
(Continued)

FOREIGN PATENT DOCUMENTS

CN 1507216 A 6/2004
CN 1810027 A 7/2006
(Continued)

OTHER PUBLICATIONS

Indian Office Action dated Feb. 7, 2020, issued in a counterpart Indian Application No. 1806/MUMNP/2015.

*Primary Examiner* — Etienne P Leroux
(74) *Attorney, Agent, or Firm* — Jefferson IP Law, LLP

(57) ABSTRACT

According to the present invention, content generated from a mobile terminal, a camera, or the like is stored automatically in a home gateway in a home network system. If synchronization is set between the home gateway and a home device, the home gateway may transmit backup content to the synchronized home device. Content may be selectively stored and classified based on a specific location, memo, voice, and the like set by a user for privacy protection.

16 Claims, 14 Drawing Sheets

(51) Int. Cl.
*H04L 12/28* (2006.01)
*H04W 12/02* (2009.01)

(52) U.S. Cl.
CPC ............. *H04L 2012/2841* (2013.01); *H04L 2012/2849* (2013.01)

(56) References Cited

U.S. PATENT DOCUMENTS

| | | | |
|---|---|---|---|
| 7,343,329 B1* | 3/2008 | Sharp | G06Q 20/1235 703/27 |
| 7,769,009 B1* | 8/2010 | Katzer | H04W 76/14 370/390 |
| 7,937,091 B2* | 5/2011 | Roman | H04L 67/104 370/386 |
| 9,183,205 B1* | 11/2015 | Kurne | G06F 16/113 |
| 2001/0026616 A1* | 10/2001 | Tanaka | G06T 1/0028 380/202 |
| 2003/0142827 A1* | 7/2003 | Ohwada | G11B 20/00086 380/277 |
| 2004/0111490 A1 | 6/2004 | Im et al. | |
| 2004/0235523 A1* | 11/2004 | Schrire | H04W 24/04 455/558 |
| 2006/0218435 A1* | 9/2006 | van Ingen | G06F 11/1451 714/6.12 |
| 2007/0098019 A1 | 5/2007 | Kelly et al. | |
| 2008/0034004 A1 | 2/2008 | Cisler et al. | |
| 2008/0036869 A1* | 2/2008 | Gustafsson | H04N 5/23203 348/222.1 |
| 2008/0130666 A1 | 6/2008 | Kawamoto et al. | |
| 2008/0253559 A1* | 10/2008 | Chao | G06F 21/6218 380/28 |
| 2009/0017876 A1* | 1/2009 | Park | H04M 1/72522 455/566 |
| 2009/0046655 A1* | 2/2009 | Zhao | H04W 24/04 370/331 |
| 2009/0075630 A1* | 3/2009 | McLean | H04L 63/0428 455/411 |
| 2010/0099382 A1* | 4/2010 | Ishiguro | H04L 12/2834 455/411 |
| 2010/0103884 A1 | 4/2010 | Doherty et al. | |
| 2010/0191590 A1* | 7/2010 | Hakkarainen | G06F 17/30864 705/14.23 |
| 2010/0205152 A1* | 8/2010 | Ansari | G06Q 30/04 707/654 |
| 2010/0241711 A1 | 9/2010 | Ansari et al. | |
| 2010/0287307 A1* | 11/2010 | John | H04L 67/02 709/248 |
| 2011/0047190 A1* | 2/2011 | Lee | H04L 67/1095 707/803 |
| 2011/0087666 A1* | 4/2011 | Chou | G06F 17/30247 707/737 |
| 2011/0119458 A1* | 5/2011 | Matsuzaki | G06F 11/1451 711/162 |
| 2011/0122219 A1* | 5/2011 | Kim | H04N 7/147 348/14.02 |
| 2011/0218967 A1* | 9/2011 | Sliger | G06F 12/00 707/647 |
| 2011/0307657 A1* | 12/2011 | Timashev | G06F 11/1451 711/112 |
| 2011/0312278 A1* | 12/2011 | Matsushita | H04L 12/40013 455/66.1 |
| 2012/0047539 A1* | 2/2012 | Hao | H04N 21/2747 725/82 |
| 2012/0198383 A1* | 8/2012 | Cisler | G06F 9/4443 715/781 |
| 2012/0330888 A1* | 12/2012 | Cruz | G06F 1/26 707/610 |
| 2013/0247117 A1* | 9/2013 | Yamada | G08C 17/02 725/93 |
| 2013/0325491 A1* | 12/2013 | Ferrari | G06Q 50/22 705/2 |
| 2014/0032328 A1* | 1/2014 | Greenfield | G06Q 30/0267 705/14.64 |

FOREIGN PATENT DOCUMENTS

| | | |
|---|---|---|
| KR | 10-2006-0035634 A | 4/2006 |
| KR | 10-2008-0057441 A | 6/2008 |
| KR | 10-2012-0087251 A | 8/2012 |
| WO | 2004/034286 A1 | 4/2004 |
| WO | 2008/086254 A1 | 7/2008 |
| WO | 2012/130348 A1 | 10/2012 |

\* cited by examiner

US 10,891,196 B2

APPARATUS AND METHOD FOR CONTENTS BACK-UP IN HOME NETWORK SYSTEM

PRIORITY

This application claims priority under 35 U.S.C. § 119(a) to a Korean Patent Application filed in the Korean Intellectual Property Office on Dec. 14, 2012 and assigned Serial No. 10-2012-0145962 and a Korean Patent Application filed in the Korean Intellectual Property Office on Oct. 29, 2013 and assigned Serial No. 10-2013-0129405, the contents of which are incorporated herein by reference.

BACKGROUND OF THE INVENTION

Field of the Invention

The present invention relates to an apparatus and method for performing content backup in a home network system.

Description of the Related Art

A home network system enables communication between home devices by connecting devices installed in a home to a wired or wireless network. An advanced home network system integrates home devices through a Home Gateway (HGW or HGW) and thus connects the home devices to an external public data network such as an Internet Protocol (IP) network (i.e., the Internet), thereby providing various services to the home devices in conjunction with the Internet. This home network system may provide a user-intended service by controlling the home devices upon user request.

SUMMARY OF THE INVENTION

Problems to be Solved by the Invention

Previously, no apparatus and method for, when a user-intended service is provided, automatically backing up content generated from a mobile terminal, a camera, or the like have been specified. Moreover, no method for selectively storing and classifying content based on user-set information such as a specific location, place, memo, and the like in order to protect privacy has been specified.

Accordingly, there is a need for a technique for automatically backing up content generated from a mobile terminal, a camera, or the like in a home network system.

An aspect of the present invention is to provide a method and apparatus for automatically backing up content generated from a mobile terminal, a camera, or the like in a home network system.

Another aspect of the present invention is to provide a method and apparatus for checking content generated from a mobile terminal, a camera, or the like in any home device connected to a home gateway, without any special manipulation.

Another aspect of the present invention is to provide a method and apparatus for automatically restricting, separating out, and storing content generated from a mobile terminal, a camera, or the like based on user-set information.

Means for Solving Problems

In accordance with an aspect of the present disclosure, there is provided a content backup method of a home gateway in a home network system. The method includes receiving, from a mobile terminal, a control command requesting backup of content generated in the mobile terminal, and backing up the content generated in the mobile terminal in response to the control command. If the content satisfies a predetermined condition, the content is automatically excluded from backup.

In accordance with another aspect of the present disclosure, there is provided a content backup apparatus of a home gateway in a home network system. The apparatus includes a receiver for receiving, from a mobile terminal, a control command requesting backup of content generated in the mobile terminal, and a controller for backing up the content generated in the mobile terminal in response to the control command. If the content satisfies a predetermined condition, the content is automatically excluded from backup.

In accordance with another aspect of the present disclosure, there is provided a content backup method of a mobile terminal in a home network system. The method includes generating content, transmitting a control command requesting backup of the generated content to a home gateway, and receiving a backup complete message indicating completion of backup of the content generated in the mobile terminal according to the control command. If the content satisfies a predetermined condition, the content is automatically excluded from backup.

In accordance with another aspect of the present disclosure, there is provided a content backup apparatus of a mobile terminal in a home network system. The apparatus includes a content generator for generating content, a transmitter for transmitting a control command requesting backup of the generated content to a home gateway, and a receiver for receiving a backup complete message indicating completion of backup of the content generated in the mobile terminal according to the control command. If the content satisfies a predetermined condition, the content is automatically excluded from backup.

DETAILED DESCRIPTION OF THE EXEMPLARY EMBODIMENTS

Figure 1:
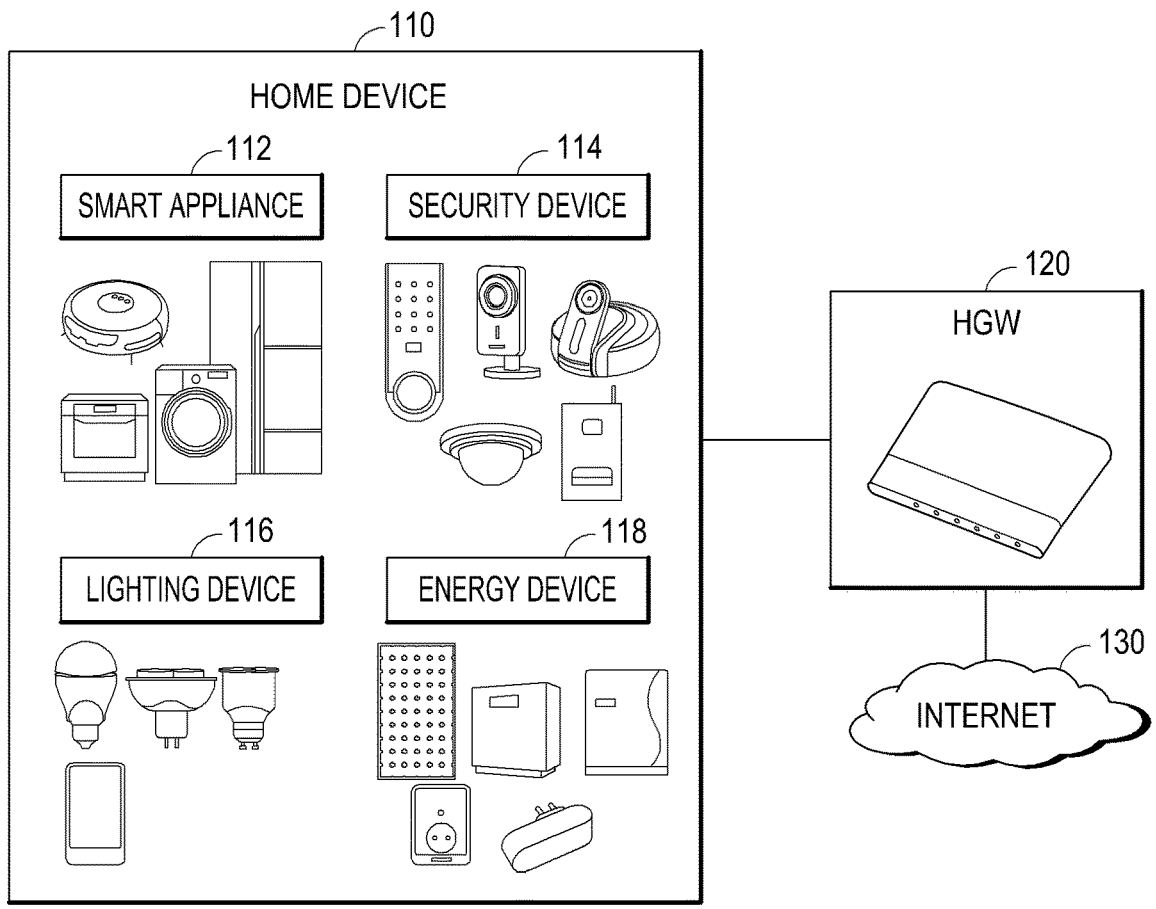
FIG. 1 is a view illustrating a simplified configuration of a home network system according to an embodiment of the present invention.

Reference will now be made in detail to the preferred embodiments of the present invention with reference to the accompanying drawings. Like reference numerals denote the same elements across the specification. A detailed description of known functions and configurations will not be given lest it should obscure the subject matter of the present invention.

Prior to the description, the terms and words used in the present specification and claims should not be interpreted to be typical or as dictionary meaning and should be interpreted as meaning and concept matching the technical concept of the present invention based on a principle in which the inventor can appropriately define the meaning of terms to describe one's own invention in the best way.

FIG. 1 is a view illustrating a simplified configuration of a home network system according to an embodiment of the present invention.

Referring to FIG. 1, the home network system includes home devices 110 equipped with a control function and a communication function and a Home GateWay (HGW) 120. The home devices 110 are located inside (or outside) a home, including smart appliances 112, security devices 114, lighting devices (hereinafter, referred to as "lightings") 116, energy devices 118, and the like. For example, the smart appliances 112 may include a smart TV, an Internet Protocol (IP) TV, a standard TV, a refrigerator, a washing machine, a robot cleaner, and the like. For example, the security devices 114 may include a door lock, a surveillance camera, a security sensor, and the like, the lightings 116 may include a Light Emitting Diode (LED) lighting and the like, and the energy devices 118 may include a power meter, a power socket, an electrical outlet, a multi-tap connector, and the like. In addition, the home devices 110 may include, for example, a Personal Computer (PC), an IP camera, an Internet phone, a wired/wireless phone, an in-house mobile phone, and the like.

The home devices 110 are capable of communicating with the HGW 120 wirelessly or wiredly. The home devices 110 may be configured to receive a control command from the HGW 120 and transmit requested information in response to the control command to the HGW 120. The HGW 120 includes communication modules for wired or wireless communication with the home devices 110. The HGW 120 may also register and back up information about the home devices 110, control operations and states of the home devices 110, and collect and manage necessary information from the home devices. Particularly, the HGW 120 may allow access of other communication terminals through the Internet, that is, the IP network 130, while being connected to a data network such as the Internet, that is, the IP network 130, and may transmit control signals received from the communication terminals to corresponding home devices.

The home network system having the above-described configuration may provide home entertainment service such as IPTV, smart TV, Video On Demand (VoD) through the Internet 130, home data communication service such as data sharing, Voice over IP (VoIP), and video call, and home automation service such as remote control of home appliances, remote metering, security, and disaster prevention. That is, the home network system controls all types of home devices inside/outside a home by networking them.

A user may remotely access, from the outside of a home, an HGW included in a home network system and each home device through the HGW, using wireless communication equipment such as a mobile terminal. The mobile terminal may be, for example, any of a Personal Digital Assistant (PDA) equipped with a communication function, a smart phone, a portable phone, a tablet computer, a laptop computer, and the like. The mobile terminal may access the home network system through an operator network and the Internet.

Figure 2:
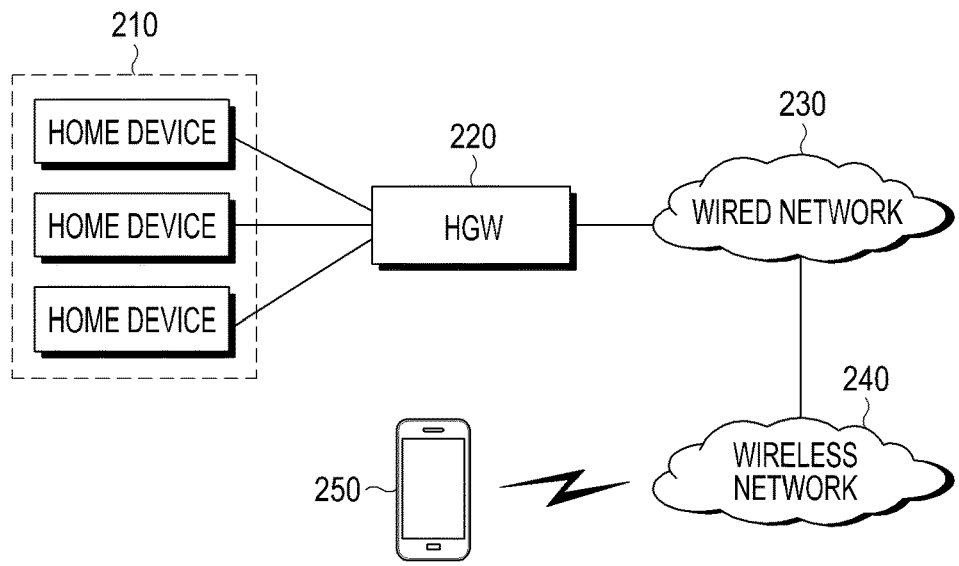
FIG. 2 is a view illustrating a configuration of a home network system connectable to a mobile terminal according to an embodiment of the present invention.

FIG. 2 is a view illustrating a simplified configuration of a home network system connectable to a mobile terminal according to an embodiment of the present invention.

Referring to FIG. 2, the home devices 110 in the home network system are connected to the HGW 120 in a wired or wireless communication scheme. The HGW 120 may be connected to a wired network 230 such as the Internet. A registered mobile terminal 250 may access a wireless network 240 including a radio access network and an operator core network and may access the HGW 220 through the wired network 230. The wireless network 240 may be a $2^{nd}$ Generation (2G) or $3^{rd}$ Generation (3G) cellular communication system, a 3rd Generation Partnership Project (3GPP) communication system, a $4^{th}$ Generation (4G) communication system, a Long Term Evolution (LTE) communication system, a World Interoperability for Microwave Access (WiMAX) communication system, or the like.

Figure 3:
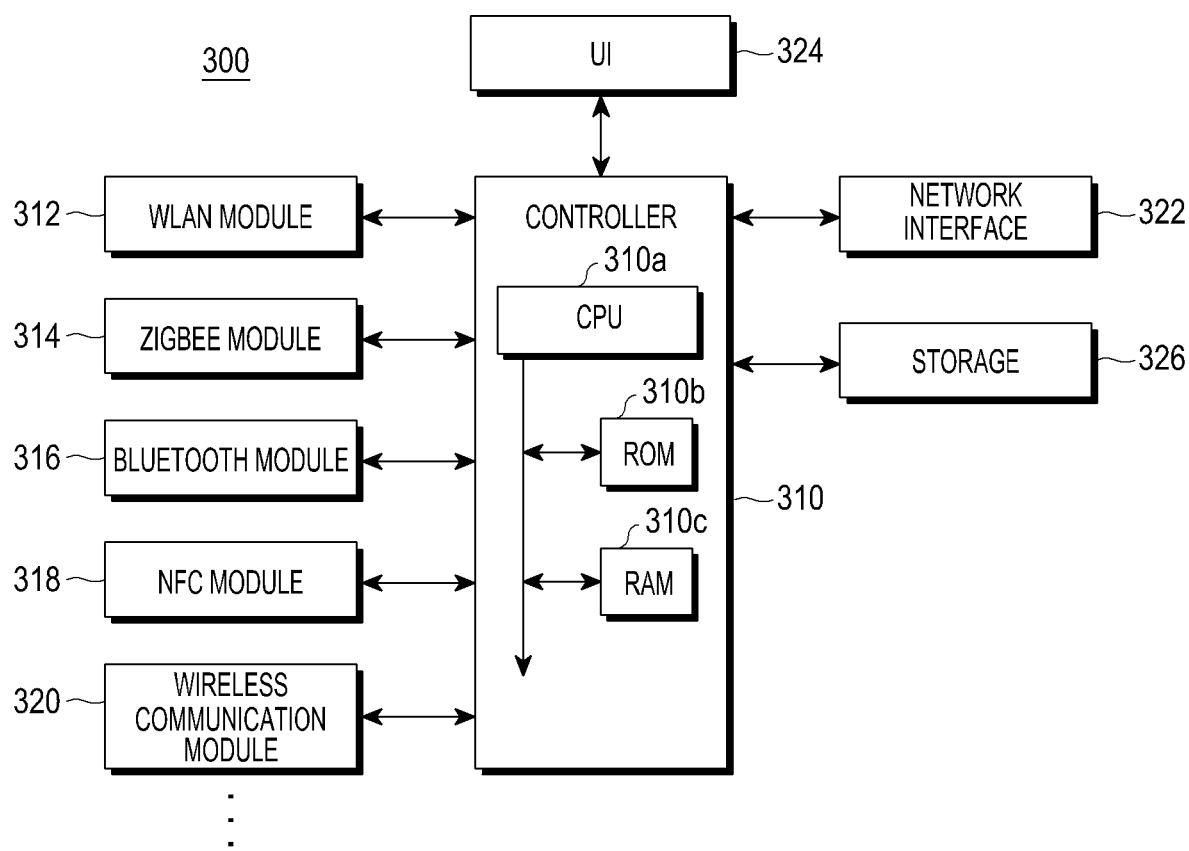
FIG. 3 is a block diagram of a home gateway according to an embodiment of the present invention.

FIG. 3 is a block diagram of an HGW according to an embodiment of the present invention. The HGW may be configured to include at least one of the components illustrated in FIG. 3.

Referring to FIG. 3, an HGW 300 may be connected to home devices (not shown) through one or more communication modules 312 to 320. The communication modules 312 to 320 include at least one of a Wireless Local Area Network (WLAN) module 312 such as Wireless Fidelity (Wi-Fi), a ZigBee module 314, a Bluetooth module 316, a Near Field Communication (NFC) module 318, and a wired communication module 320. The HGW 300 further includes a controller 310, a network interface module 322, a User Interface (UI) 324, and a storage 326.

The controller 310 includes a Central Processing Unit (CPU) 310a, a Read-Only Memory (ROM) 310b that stores a control program for controlling the HGW 300, and a Random Access Memory 310c used as a working memory for operations performed in the HGW 300. The controller 310 communicates with home devices through the communication modules 312 to 320 by executing a program stored in the ROM 310b or the RAM 310c or an application program stored in the storage 326, generates and transmits control commands to the home devices, or stores information collected from the home devices in the storage 326.

The UI 324 includes output modules such as a display, a speaker, and an indication lamp, and input modules such as a touch screen, a keypad, and a microphone. The UI 324 may be used for a user directly to control the HGW 300, to register or deregister home devices to or from the HGW 300, or to control home devices through the HGW 300.

The network interface module 322 may be, for example, an Internet communication module and connects the HGW 300 to an external network.

The storage 326 is configured to store program code, data, or information needed for operations of the HGW 300 under the control of the controller 326. When needed, the storage 326 may store a large amount of data received from an external device or a home device.

Figure 4:
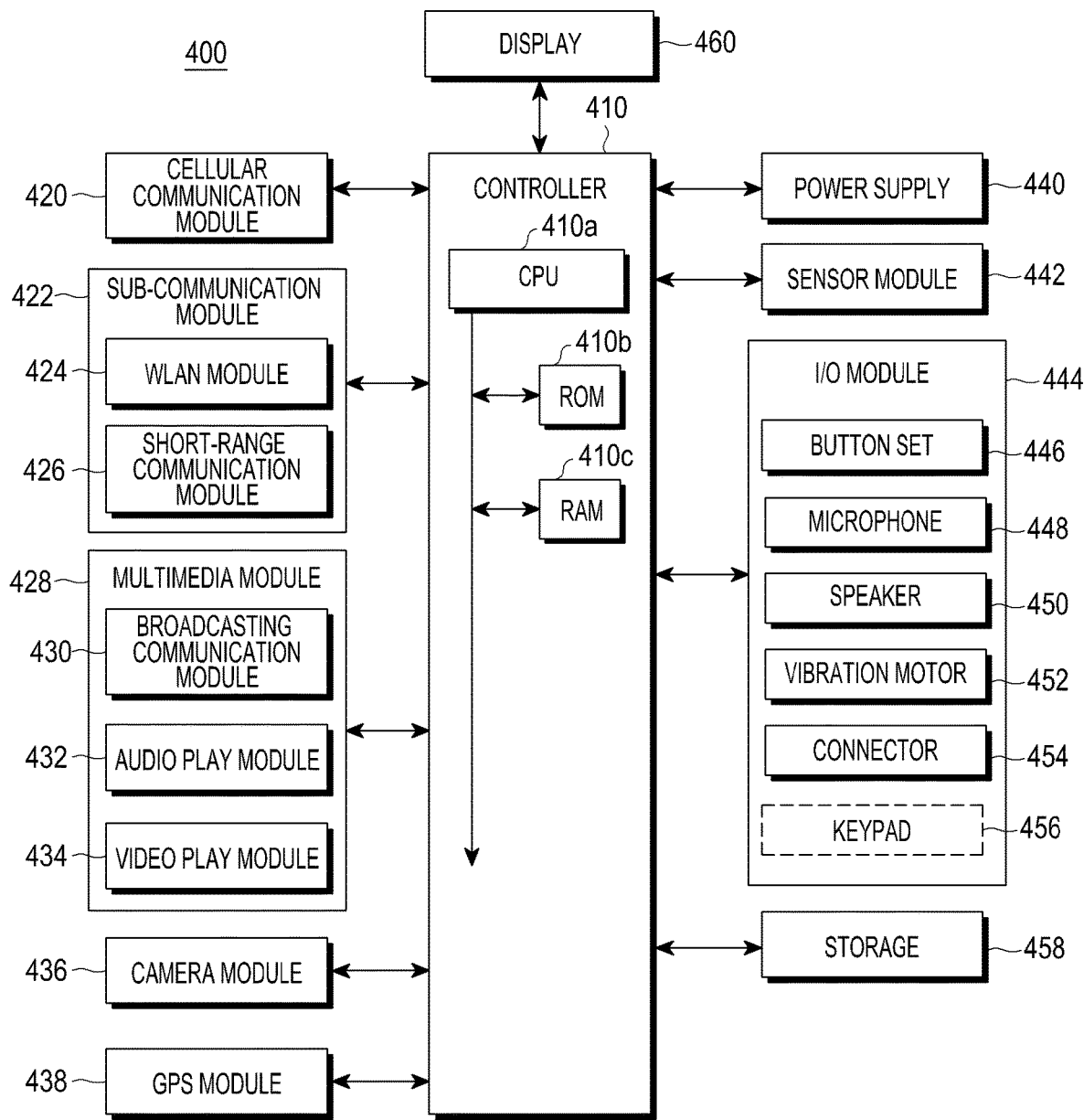
FIG. 4 is a block diagram of a mobile terminal according to an embodiment of the present invention.

FIG. 4 is a block diagram of a mobile terminal according to an embodiment of the present invention. The mobile terminal may be configured to include at least one of the components illustrated in FIG. 4.

Referring to FIG. 4, a mobile terminal 400 is configured to include a controller 410, a cellular communication module 420, a sub-communication module 422, a multimedia module 428, a camera module 436, a Global Positioning System (GPS) module 438, an Input/Output (I/O) module 444, a sensor module 442, a storage 458, a power supply 440, and at least one display 460. The sub-communication module 422 includes at least one of a WLAN module 424 and a short-range communication module 426. The multimedia module 428 includes at least one of a broadcasting communication module 430, an audio play module 432, and a video play module 434. The camera module 436 includes at least one camera. The I/O module 444 includes at least one of a button set 446, a microphone 448, a speaker 450, a vibration motor 452, a connector 454, and a keypad 456.

The controller 410 includes a CPU 410a, a ROM 410b that stores a control program for controlling the mobile terminal 400, and a RAM 410c that stores a signal or data received from the outside of the mobile terminal 400 and that is used as a working memory for operations of the mobile terminal 400. The controller 410 controls the other components of the mobile terminal 400.

The cellular communication module 420 connects the mobile terminal 400 to an external device (particularly, a Base Station (BS) of a cellular system) through one or more antennas (not shown) by a radio access technology based on a cellular communication protocol under the control of the controller 410. The cellular communication module 420 transmits/receives a wireless signal for voice call, video call, Short Messaging Service (SMS), or Multimedia Messaging Service (MMS) to/from another communicable device. In addition, the cellular communication module 420 may transmit/receive short data for controlling applications or the like.

The WLAN module 424 may be connected to the Internet in a place where a wireless Access Point (AP) (not shown) is installed under the control of the controller 410. The short-range communication module 426 may conduct short-range communication wirelessly between the mobile terminal 400 and an external device under the control of the controller 410. The short-range communication may conform to Bluetooth, ZigBee, Infrared Data Association (IrDA), or the like.

The display 460 may be configured as a touch screen that displays information of various applications (e.g., call, data transmission, broadcasting, camera, and the like) executable by the controller 410 and provides UIs adapted to the applications. The controller 410 may control selection of a soft key displayed on the touch screen or execute an application or function corresponding to a soft key in response to a user gesture sensed on the touch screen. The user gesture includes a touch of a finger or a tool, a motion made by a human body, and the like.

In a home network system configured as described above, a user may want to back up content (e.g., music, movies, music video, and the like) generated from a mobile terminal or a camera to an HGW. In addition, the user may want to transmit content backed up in the HGW to a synchronized home device or a synchronized external device. To satisfy the user demands, an optimum environment needs to be built in advance.

Operations of the HGW for building an optimum environment in advance are listed in [Table 1].

TABLE 1

| Operation | Description |
|---|---|
| Connected device control | Register and deregister devices that can back up |
| Data space control | Allocate memory space for backup |
| Communication scheme | Prioritize mobile communication network, Wi-Fi, and the like |
| Control of store or not-store | Set store or no-store by allowing selection of content type, content capacity, and the like |
| Reception indicator | Provide indicator indicating reception, such as LED, sound, and the like |
| Notification to members | Notify members of new content backup |
| Memory space | In case of capacity shortage, delete data in order of oldest, indicate capacity shortage to user, or connect to external memory |
| Status indication | Indicate available memory space and backup finish time, and provide control panel function (disk cleanup and the like) |

Referring to [Table 1], the HGW may register and deregister devices that can back up content and may prioritize communication schemes such as wired or wireless networks. The HGW may also provide an indicator such as an LED, an alarm sound, and the like to indicate reception and may indicate new content backup to members. In the case of data capacity shortage, the HGW may set deletion of data in order of the oldest stored date, indication data capacity shortage to the user, or connection to an external memory. The HGW may set indication of an available memory capacity and a backup finish time and may set providing of a control panel function (e.g., disk cleanup and the like). While not depicted in [Table 1], the HGW may set decompression of content compressed by the mobile terminal, when the mobile terminal requests backup of the content. While not depicted in [Table 1], the HGW may set checkout of other members in the home network in real time during content backup.

Operations of a mobile terminal required to build an optimum environment in advance are listed in [Table 2]

TABLE 2

| Operation | Description |
| --- | --- |
| Transmission control | Control whether to automatically back up or prompt user to select backup or non-backup each time event occurs |
| Transmission scheme | Prioritize mobile communication network, Wi-Fi, and the like |
| Control of transmission capacity | In case of large-data transmission in mobile communication network, output warning message or restrict transmission of several megabytes |
| Privacy protection | exclude content captured at specific time and place on specific date from backup<br>exclude content captured in user-set region from backup<br>exclude content from backup based on specific memo (e.g. S memo) and voice stored together with content |
| Upload indicator | Display status of ongoing data backup |
| Backup scheme setting | Select various schemes such as automatic, automatic within user-set range, manual, backup upon specific NFC connection, and the like |
| Member notification | Indicate new content backup to members |

Referring to [Table 2], the mobile terminal may set whether to back up content automatically or in an event-triggered manner. The mobile terminal may prioritize communication schemes such as wired or wireless networks. In the case of a large amount of data in a mobile communication network, the mobile terminal may set output of a warning message or set a transmission capacity to restrict transmission of data of several megabytes or more. In addition, the mobile terminal may set exclusion of content captured at a specific time and place on a specific date, content captured in a user-set region, and the like, from backup. Besides locations and regions, user-input information during capturing content such as memos and voice stored together with content such as a photo, a video, and the like may be used in setting backup exceptions.

The mobile terminal may set display of a status indicating ongoing data backup. The mobile terminal may set selection of a backup scheme from among automatic backup, automatic backup within a user-set range, manual backup, backup upon specific NFC connection, and the like. The mobile terminal may set indication of new content backup to members.

While not depicted in [Table 2], the mobile terminal may set a terminal state that may affect backup, for example, battery status, communication network signal strength, and the like.

While not depicted in [Table 2], the mobile terminal may set decompression of content compressed and backed up in the mobile terminal, in the HGW.

As described above, an optimum environment is built in advance. Then an initialization procedure between a home device and an HGW is performed as follows.

Figure 5:
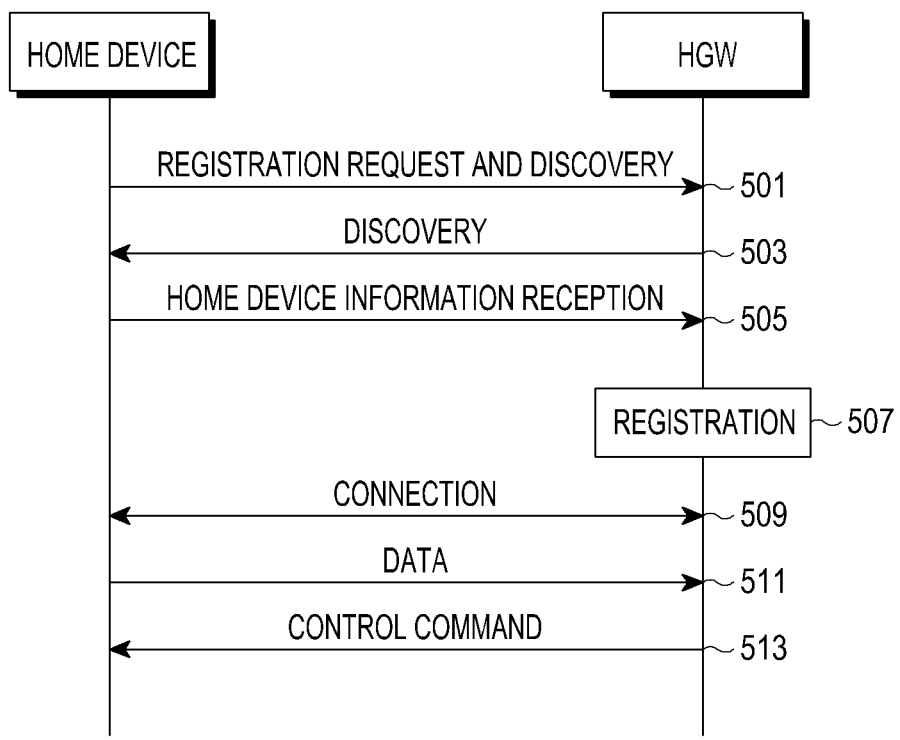
FIG. 5 is a flowchart illustrating an initialization procedure between a home device and a home gateway.

FIG. 5 is a flowchart illustrating an initialization operation between a home device and an HGW.

Referring to FIG. 5, once a home device is installed, power is initially supplied to the home device. A newly installed home device or an already installed home device transmits a registration request message to the HGW, requesting registration in operation 501. The HGW performs a discovery procedure for the home device in operation 503. For example, if the home device is connected to the HGW by Wi-Fi, the HGW performs a discovery procedure to discover a new neighboring device periodically or upon user request. If the HGW discovers the home device by the discovery procedure, the HGW receives information about the home device included in a registration response message being a response to the registration request message from the home device in operation 505. The information about the home device includes at least one of an Identifier (ID) of the home device, capacity information about the home device, and status information about the home device. Upon receipt of the information about the home device from the home device in operation 505, the HGW completes registration of the home device in operation 507. In addition, as the HGW stores the information about the home device in operation 507, the HGW completes the registration procedure and manages the home device as registered.

The HGW establishes a connection with the home device in operation 509. The connection is established in a predetermined procedure conforming to a communication scheme between the HGW and the home device, such as Wi-Fi, ZigBee, Bluetooth, NFC, or a wireless communication scheme. Once the connection is established between the HGW and the home device, the home device may transmit data to the HGW via the connection, when needed in operation 511. In operation 513, the HGW may transmit a control command to the home device, when needed.

A registration procedure may further be needed between a mobile terminal and the HGW.

Figure 6:
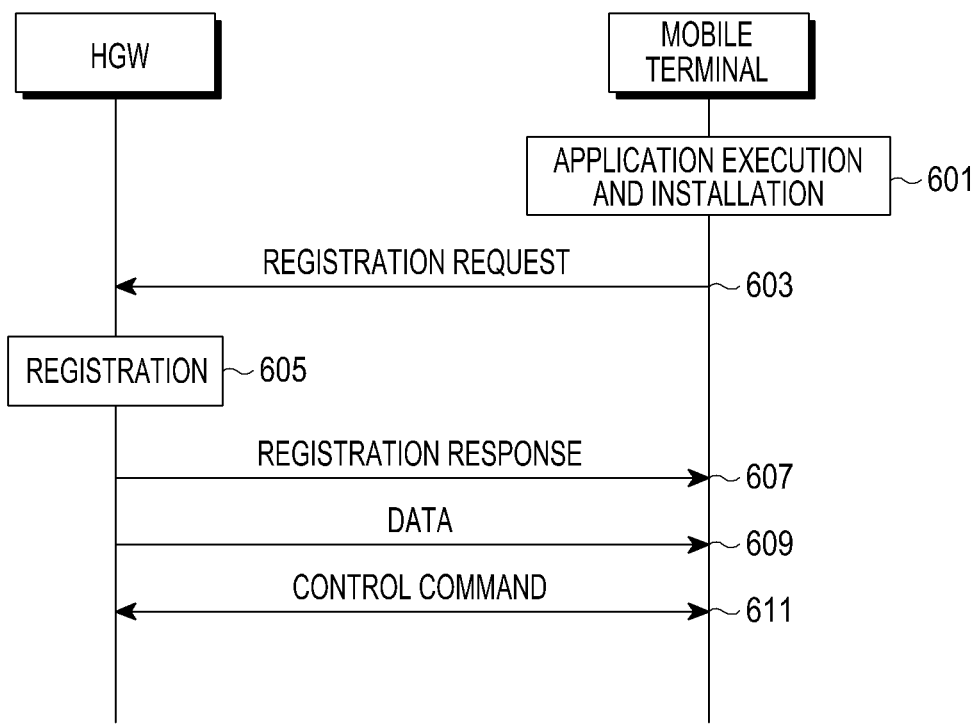
FIG. 6 is a flowchart illustrating a registration procedure between a mobile terminal and a home gateway.

FIG. 6 is a flowchart illustrating a registration between a mobile terminal and an HGW.

Referring to FIG. 6, the mobile terminal installs and executes an application that enables communication between the mobile terminal and the HGW in operation 601. The application may be restricted to mobile terminals of users that have passed a predetermined authentication procedure. The HGW assigns an authentication number and the HGW, a manufacturer server of the HGW, or a provider server of the application allows only a mobile terminal of a user entering an assigned authentication number to download the application. In operation 603, the mobile terminal executes the application and transmits a registration request message to the HGW. The application may be transmitted to the HGW over the Internet or directly by Wi-Fi. The registration request message includes at least one of an ID of the mobile terminal (e.g., an MS Identifier (MSID) or an International Mobile Subscriber Identity (IMSI)), a log-in ID and a password, authorization information, and mode information.

The HGW stores information about the mobile terminal and manages the mobile terminal as registered in operation 605. In operation 607, the HGW transmits a registration response message indicating successful registration of the information about the mobile terminal to the mobile terminal.

When needed, the HGW may transmit data required for backup mode to the mobile terminal according to an embodiment of the present invention in operation 609. In operation 611, the mobile terminal may transmit a control command for the HGW or at least one home device to the HGW, when needed.

After the above-described operations are performed in advance, content may be backed up according to an embodiment of the present invention.

Figure 7:
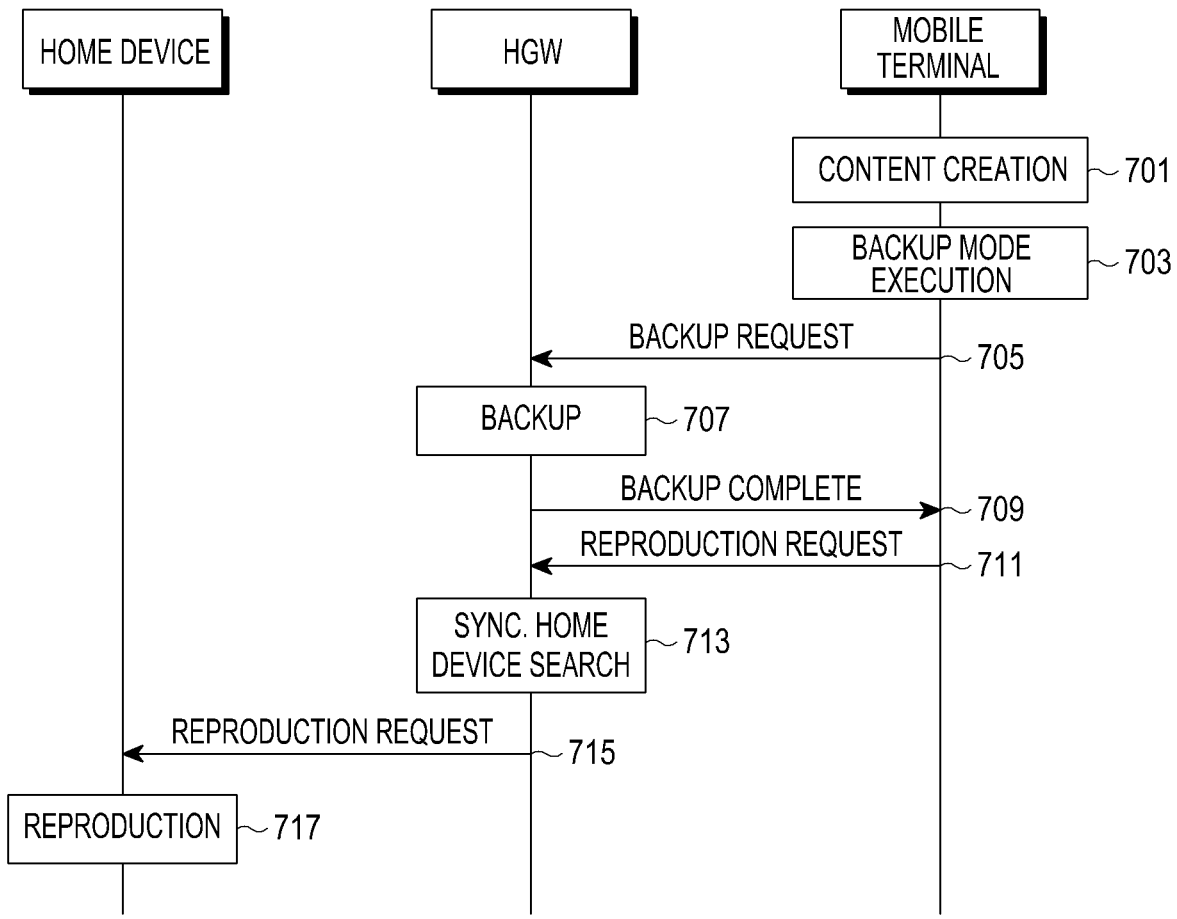
FIG. 7 is a flowchart illustrating a content backup method in a home network system according to an embodiment of the present invention.

FIG. 7 is a flowchart illustrating a content backup method in a home network system according to an embodiment of the present invention.

In the present invention, content may include, for example, music, pictures, video, and the like. In an embodiment of the present invention, a mobile terminal generates content and classifies the generated content, for example, as figure, scene, night scene, or the like in operation 701. It is assumed that the mobile terminal is capable of transmitting and receiving data over a wired or wireless network. In an applicable embodiment, the generated content may include content acquired by capturing a picture or a video in the mobile terminal. In another applicable embodiment, the generated content may include content that the mobile terminal downloads from a specific server free of charge or on payment. In another applicable embodiment, the generated content may include content acquired by editing already existing content in the mobile terminal In another applicable embodiment, the generated content may include screen-captured content in the mobile terminal. In another applicable embodiment, the generated content may include a text file created or edited in the mobile terminal. In another applicable embodiment, the generated content may include content backed up when a new phone number is added in the mobile terminal. In another applicable embodiment, the generated content may include content received from another terminal in the mobile terminal.

When a user selects the backup mode, the mobile terminal executes the backup mode in operation 703. In an applicable embodiment, the backup mode may be executed by installing and executing a specific application in the mobile terminal. In another applicable embodiment, the backup mode may be an already configured function in the mobile terminal.

Content may be backed up automatically in various manners depending on a backup mode setting and the backup content may be checked in home devices.

The mobile terminal requests backup to the HGW in operation 705. The backup may be requested by transmitting a backup mode request message requesting backup of content of the mobile terminal to the HGW by the mobile terminal. Then the HGW backs up the content received from the mobile terminal in operation 707. Upon completion of the backup, the HGW transmits a backup complete message indicating completion of the backup to the mobile terminal in operation 709. Then, the mobile terminal requests content reproduction to the HGW in operation 711. Herein, a Synchronization (hereinafter, referred to "Sync.") device, a Sync. communication scheme, a Sync. time, and the like should be preset in the mobile terminal. Without operation 711, the following operations 713 through 717 may be performed.

Upon receipt of the reproduction request, the HGW searches for home devices set as Sync. devices in operation 713. Herein, the HGW may search for outdoor devices set as Sync.devices as well as home devices set as Sync. devices.

In the presence of any device identical to a Sync. device set in the mobile terminal, the HGW transmits a reproduction request message to at least one detected home device in operation 715. For example, the home device may be a TV. Upon request of the HGW, the home device reproduces the backup content in operation 717.

Figure 8:
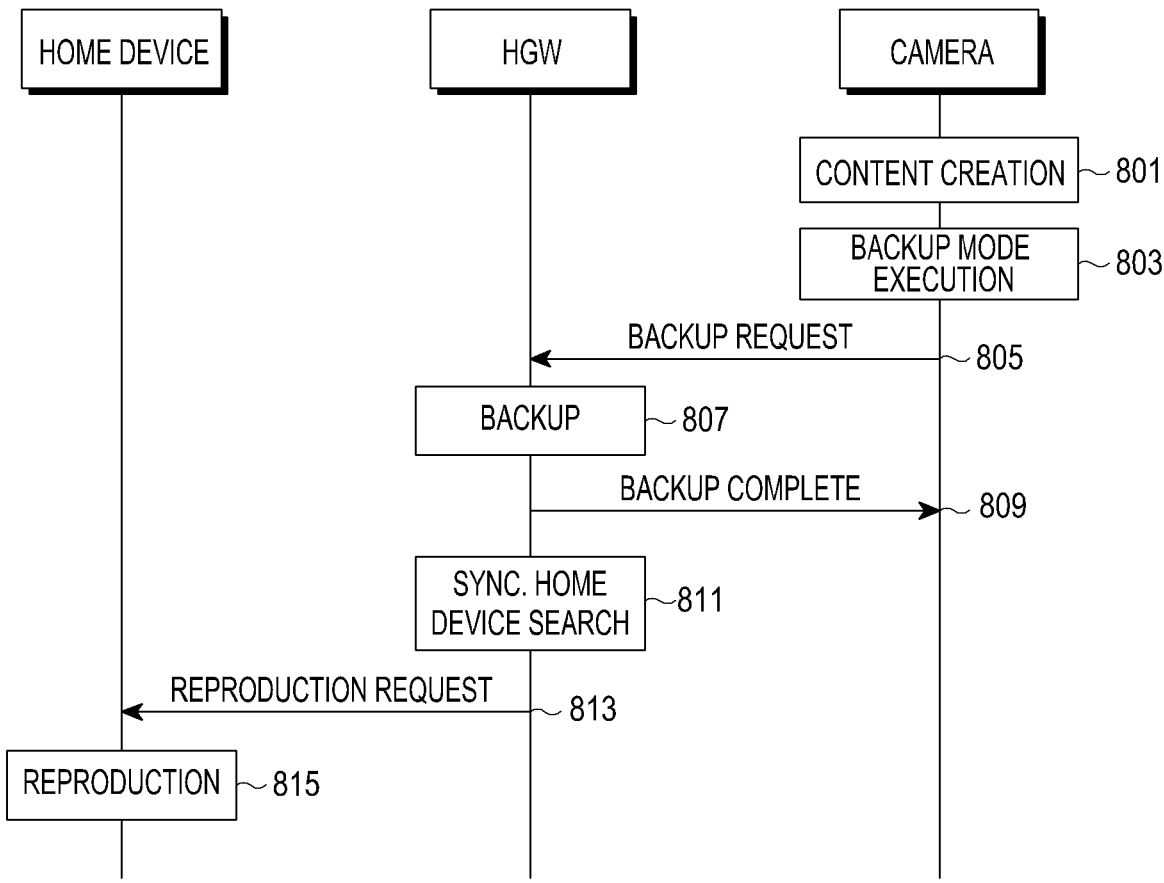
FIG. 8 is a flowchart illustrating a content backup method in a home network system according to another embodiment of the present invention.

FIG. 8 is a flowchart illustrating a content backup method in a home network system according to another embodiment of the present invention.

In the present invention, content may include, for example, music, pictures, video, and the like. In another embodiment of the present invention, a camera generates content and classifies the generated content, for example, as figure, scene, night scene, or the like in operation 801. It is assumed that the camera is capable of transmitting and receiving data over a wired or wireless network. In an applicable embodiment, the generated content may include content acquired by capturing a picture or a video with the camera. In another applicable embodiment, the generated content may include content that the camera downloads from a specific server free of charge or on payment. In another applicable embodiment, the generated content may include content acquired by editing already existing content in the camera. In another applicable embodiment, the generated content may include screen-captured content in the camera. In another applicable embodiment, the generated content may include content received from another mobile terminal.

When a user selects the backup mode, the camera executes the backup mode in operation 803.

In an applicable embodiment, the backup mode may be executed by installing and executing a specific application in the camera. In another applicable embodiment, the backup mode may be an already configured function in the camera.

Content may be backed up automatically in various manners depending on a backup mode setting in the camera and the backup content may be checked in home devices.

The camera requests backup to the HGW in operation 805. The backup may be requested by transmitting a backup mode request message requesting backup of content of the mobile terminal to the HGW by the mobile terminal. Then the HGW backs up the content received from the mobile terminal in operation 807. Upon completion of the backup, the HGW transmits a backup complete message indicating completion of the backup to the mobile terminal in operation 809. Upon completion of the backup, the HGW searches for home devices set as Sync. devices in operation 811. Herein, the HGW may search for outdoor devices set as Sync.devices as well as home devices set as Sync. devices.

Before the search operation, the user should preset Sync. devices, Sync. communication schemes, Sync. time, and the like to the HGW.

In the presence of any device identical to a set Sync. device, the HGW transmits a reproduction request message to at least one detected home device in operation 813. For example, the home device may be a TV. Upon request of the HGW, the home device reproduces the backup content in operation 815.

Figure 9:
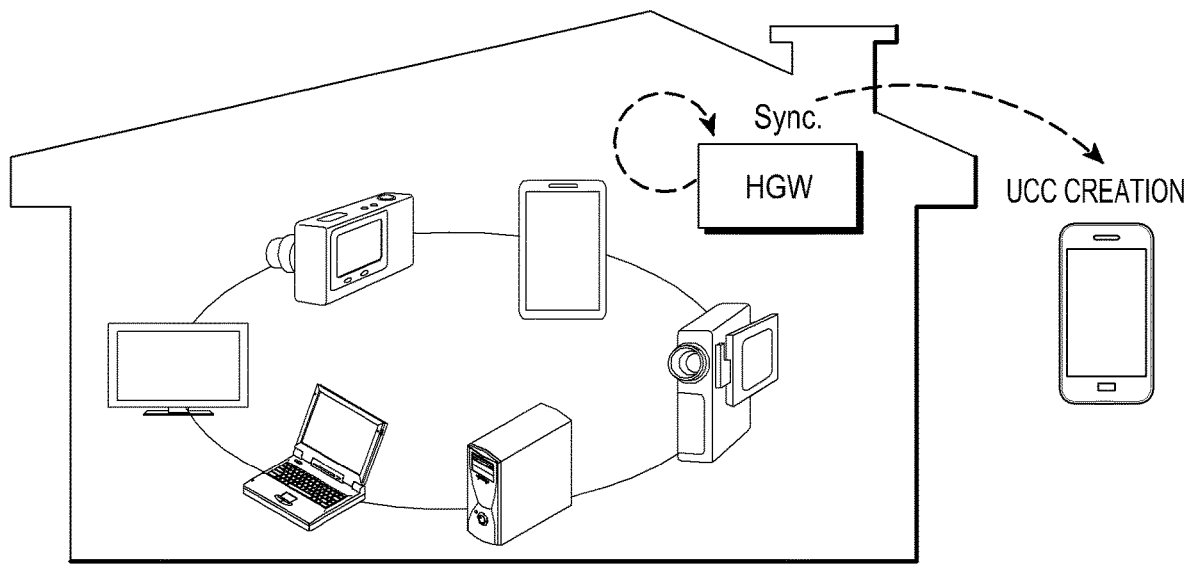
FIG. 9 is a view illustrating a configuration of a home network system supporting backup mode according to an embodiment of the present invention.

FIG. 9 is a view illustrating a configuration of a home network system supporting backup mode according to an embodiment of the present invention.

Referring to FIG. 9, the home network system includes an HGW, at least one home device including a mobile terminal in a home and a mobile terminal or a home device outside the home.

The mobile terminal is any of a smart phone, an IP camera, and the like, as illustrated in FIG. 9.

Home devices may include a mobile terminal, a tablet computer, a PC, an IP camera, an Internet phone, a wired/wireless phone, an in-house mobile phone, and the like.

The HGW is connected to in-house home devices to automatically back up content, as set in a mobile terminal for each situation by a user and stores information about home devices connected to a home network (e.g., a list of home devices capable of reproducing content, and the like). Upon receipt of a backup mode request message from the mobile terminal, the HGW backs up content received from the mobile terminal. Accordingly, the HGW updates each home device list. During the backup in the HGW, streaming content may be reproduced in another device in real time. In an applicable embodiment, the HGW may use content after completing backup of the content. In an applicable embodiment, the HGW may transmit a message indicating Sync. devices and Sync. in progress to the mobile terminal In an applicable embodiment, the HGW may transmit content to Sync. devices (an indoor home device or an outdoor device) by short-range communication.

In an applicable embodiment, a home device may be an indoor home appliance and connected to the home network. Upon receipt of a reproduction request message from the HGW, the home device reproduces content.

In the present invention, an outdoor member may check newly updated content. For this purpose, upon generation of newly updated content, the HGW may indicate the generation of newly updated content to the mobile terminal. The mobile terminal may provide a UI indicating the update. A different interface may be used according to updated content.

The HGW may set a communication network to be used (e.g., a mobile communication network, Wi-Fi, and the like) by determining whether a device to receive content is indoors or outdoors. In the case of a paid communication network, the HGW may indicate that a large file is downloaded on payment. If the reproduced content is different from the original content in size, pixels, and the like, the HGW may automatically convert the content to an optimum size.

Figure 10:
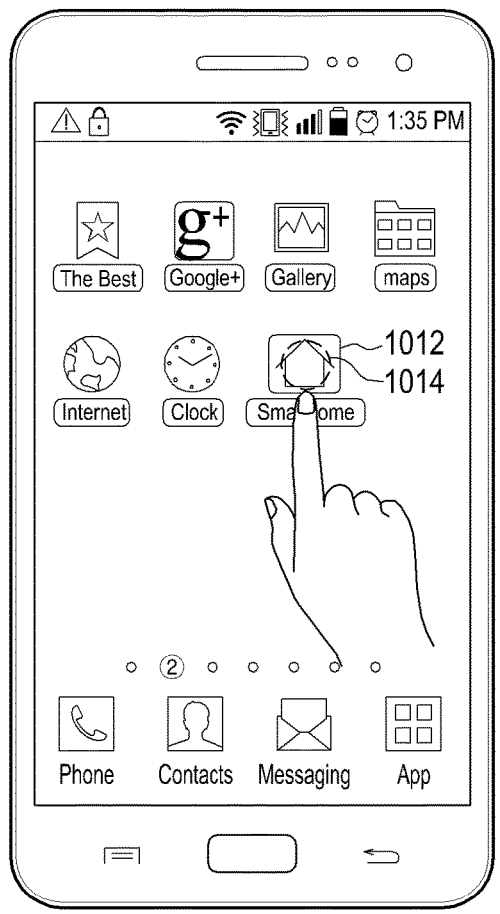
FIG. 10 illustrates a user interface for executing backup mode in a mobile terminal to support the backup mode according to an embodiment of the present invention.

FIG. 10 illustrates a UI for executing backup mode in a mobile terminal to support the backup mode according to an embodiment of the present invention.

Referring to FIG. 10, the mobile terminal provides an icon 1002 for execution of an installed application. Upon sensing a user gesture 1004 on the icon 1002, the mobile terminal executes a smart home application. In another embodiment of the present invention, the mobile terminal provides an icon that allows a user to input a voice command. Upon sensing of a user gesture on the icon and receipt of a voice command such as "Smart Home", the mobile terminal executes the smart home application. A different UI may be used according to the type of a mobile terminal, features of the mobile terminal, and the like.

Figure 11:
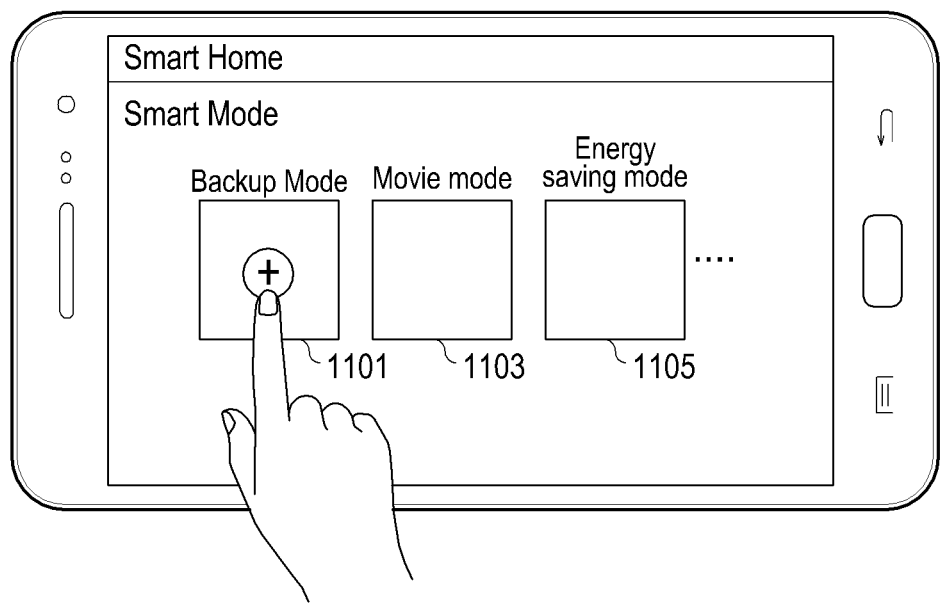
FIG. 11 illustrates a user interface for backup mode in a backup mode application as a continuation to FIG. 10 according to an embodiment of the present invention.

FIG. 11 illustrates a UI for backup mode in a backup mode application as a continuation to FIG. 10 according to an embodiment of the present invention.

Referring to FIG. 11, upon user selection of the smart home application, the mobile terminal provides smart mode icons. The smart mode icons are, for example, a backup mode icon 1101, a movie mode icon 1103, an energy saving mode icon 1105, and the like. The movie mode icon 1103 and the energy saving mode icon 1105 are beyond the scope of the present invention and thus will not be described herein in detail.

The backup mode illustrated in FIG. 11 refers to the proposed backup mode of the present invention. Upon sensing a touch for the backup mode, the mobile terminal may provide a UI to execute the backup mode, as illustrated in FIG. 12.

Figure 12:
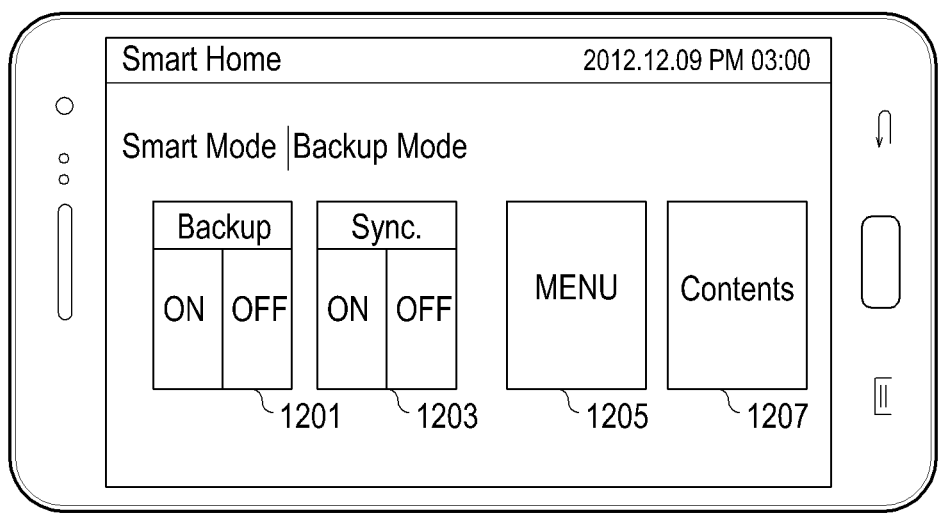
FIG. 12 illustrates a user interface for the backup mode in the backup mode application as a continuation to FIG. 11 according to an embodiment of the present invention.

FIG. 12 illustrates a UI for the backup mode in the backup mode application as a continuation to FIG. 11 according to an embodiment of the present invention.

Referring to FIG. 12, upon sensing a touch on the backup mode icon, the mobile terminal displays a backup ON/OFF icon 1201 for controlling "ON/OFF" of a content backup function, a Sync. ON/OFF icon 1203 for setting Sync. devices, a menu icon 1205 for presetting the backup mode in various manners, and a content icon 1207.

Figure 13:
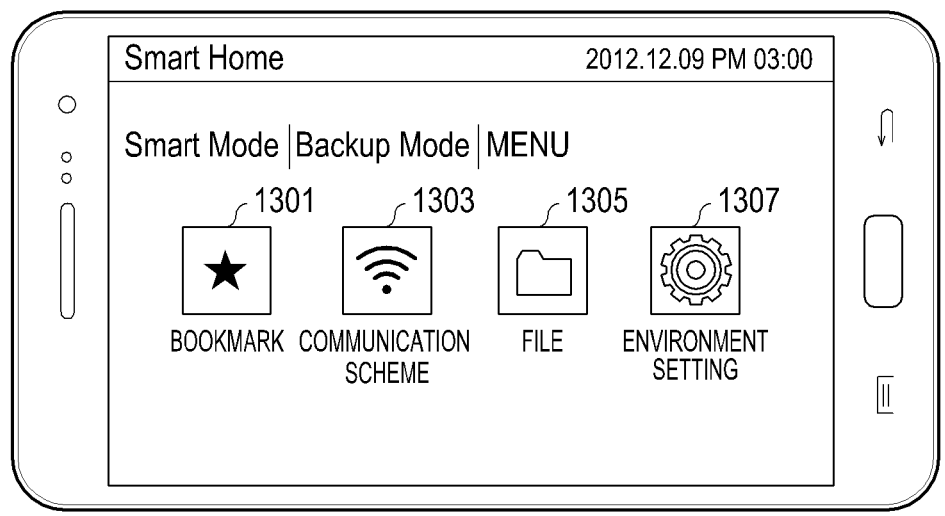
FIG. 13 illustrates a user interface for the backup mode in the backup mode application as a continuation to FIG. 12 according to an embodiment of the present invention.

FIG. 13 illustrates a UI for the backup mode in the backup mode application as a continuation to FIG. 12 according to an embodiment of the present invention.

Referring to FIG. 13, upon sensing a touch on the menu icon, the mobile terminal provides, for example, a bookmark icon 1301, a communication scheme icon 1303, a file icon 1305, and an environment setting icon 1307.

The bookmark icon 1301 provides a frequently used mode, the latest used mode, and all modes used so far. The communication scheme icon 1303 enables the user to select one of Wi-Fi, ZigBee, Bluetooth, NFC, and 3G/LTE. The file icon 1305 is used to invoke content stored in the mobile terminal, when the content stored in the mobile terminal is to be used. The file icon 1305 is also used to back up content in the mobile terminal. The environment setting icon 1307 enables the user to directly set an environment, in order to provide a backup mode service according to an embodiment of the present invention. For example, as illustrated in [Table 2] and the related description, an environment may be set in the mobile terminal.

Figure 14:
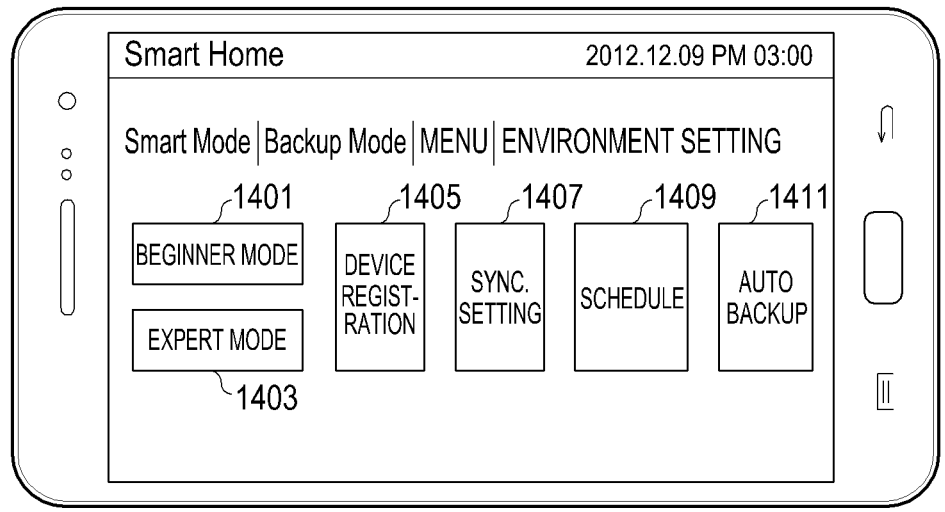
FIG. 14 illustrates a user interface for the backup mode in the backup mode application as a continuation to FIG. 13 according to an embodiment of the present invention.

FIG. 14 illustrates a UI for the backup mode in the backup mode application as a continuation to FIG. 13 according to an embodiment of the present invention.

Referring to FIG. 14, upon sensing a touch on the environment setting icon, the mobile terminal provides a beginner mode icon 1401 and an expert mode icon 1403 to prompt the user to select between beginner mode and expert mode. The mobile terminal also provides a device registration icon 1405 to allow the user to select/register a home device list. The device registration icon 1405 enables selection/registration of a list of devices that can back up. The mobile terminal provides a Sync. setting icon 1407 to allow the user to set Sync. devices, select a Sync. communication scheme, and set a Sync. time.

If the backup mode is scheduled, the mobile terminal notifies the user of the backup mode scheduling before a scheduled time. Unless the user cancels the scheduled backup mode, the mobile terminal provides a schedule icon 1409 for backup execution. The schedule icon 1409 may schedule content that is not yet on a market and, when the content is on the market, may indicate the content being on the market to the user.

The mobile terminal provides an auto backup icon 1411 to allow the user to select between automatic backup and event-triggered backup.

While not shown in FIG. 14, the mobile terminal may provide an auto/manual icon so that when the user comes back to a home from the outside, the backup mode may be set as automatic or manual.

While not shown in FIG. 14, the mobile terminal may provide an icon that enables prioritization of communication schemes such as wired or wireless networks. In the case of a mobile communication network, the mobile terminal may provide an icon by which to set output of a warning message or to set a transmission capacity so as to prohibit transmission of data exceeding a predetermined number of megabytes, when a large amount of data is to be transmitted. The mobile terminal may set exclusion of content captured at a specific time and place on a specific date, content generated in a user-set region, and content stored with a specific voice and memo along with the content, from backup. The mobile terminal may provide an icon that sets display of a status indicating data backup in progress. The mobile terminal may set selection of various backup schemes such as automatic, automatic in a user-set range, manual, backup upon a specific NFC connection, and the like. The mobile terminal may also provide an icon with which notification of new content backup to a user is set. In addition, the mobile terminal may provide an icon with which to set a terminal status affecting backup. The mobile terminal may further provide an icon with which to set decompression of content compressed and backed up by the mobile terminal in the HGW.

Figure 15:
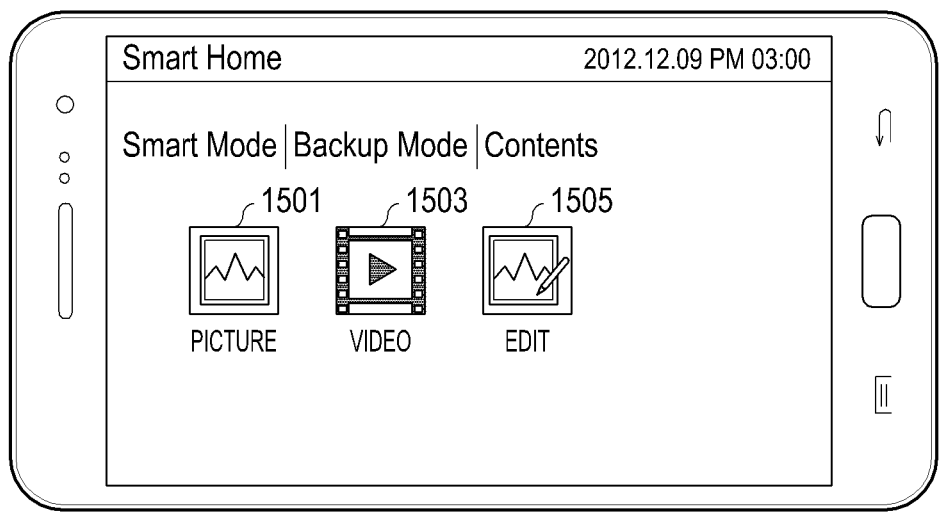
FIG. 15 illustrates a user interface for the backup mode in the backup mode application as a continuation to FIG. 12 according to an embodiment of the present invention.

FIG. 15 illustrates a UI for the backup mode in the backup mode application as a continuation to FIG. 12 according to an embodiment of the present invention.

Referring to FIG. 15, upon sensing a touch on the content icon, the mobile terminal provides a picture icon 1501 and a video icon 1503 so that the user may select a picture and a video. With the picture icon 1501, the user may select a picture stored in the mobile terminal. With the video icon 1503, the user may select a video stored in the mobile terminal. Upon sensing a touch on the content icon, the mobile terminal also provides an edit icon 1505. When the user touches the edit icon 1505, the edit icon 1505 enables the user to edit a captured picture or video.

Figure 16:
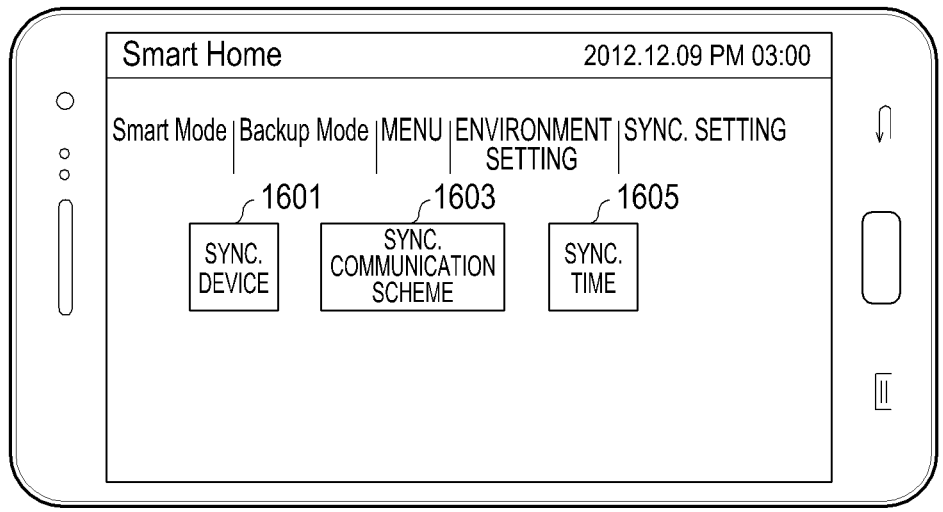
FIG. 16 illustrates a user interface for the backup mode in the backup mode application as a continuation to FIG. 12 according to an embodiment of the present invention.

FIG. 16 illustrates a UI for the backup mode in the backup mode application as a continuation to FIG. 12 according to an embodiment of the present invention.

Referring to FIG. 16, upon sensing a touch on the Sync. icon, the mobile terminal provides a Sync. device icon 1601, a Sync. communication scheme icon 1603, and a Sync. time icon 1605 so that the user may set a Sync. device, a Sync. communication scheme, and a Sync. time.

The Sync. device icon 1601 may enable display of Sync.-enabled devices so that the user may select a Sync.-enabled device.

The Sync. communication scheme icon 1603 enables setting of a communication scheme for data transmission, when Sync. is set. For example, Sync. communication schemes may include NFC, Wi-Fi, Bluetooth, ZigBee, and the like.

The Sync. time icon 1605 enables setting of a time for data transmission to a Sync. device, when Sync. is set.

Figure 17:
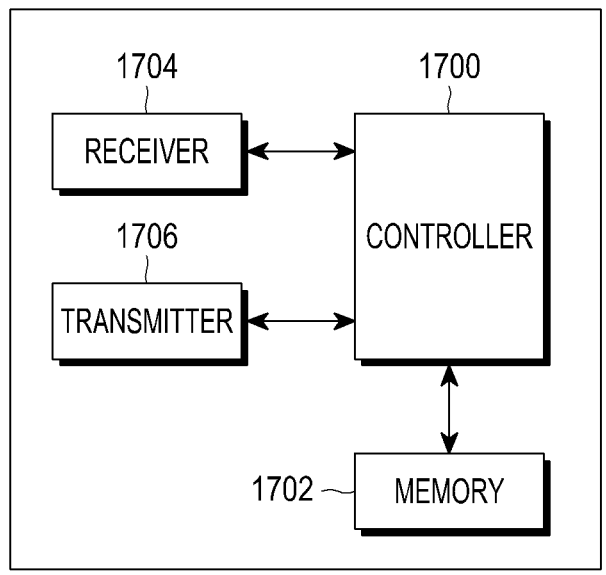
FIG. 17 is a block diagram of a home gateway according to an embodiment of the present invention.
Figure 18:
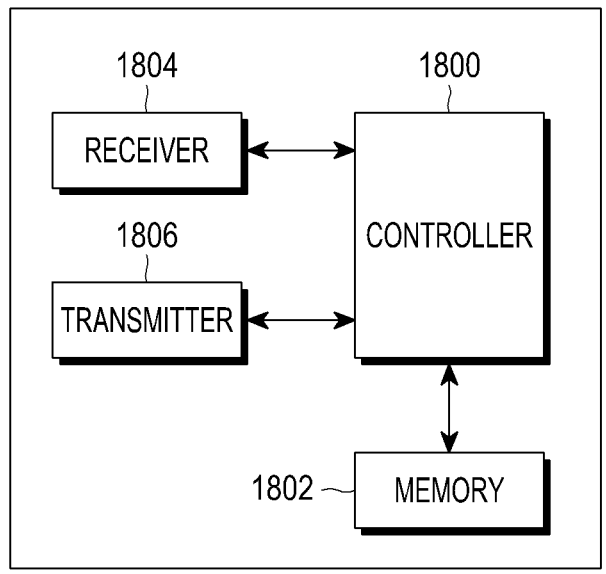
FIG. 18 is a block diagram of a mobile terminal according to an embodiment of the present invention.

While a mobile terminal and a camera are described separately in FIGS. 17 and 18, the above-described operations of a mobile terminal include operations of a camera.

FIG. 17 is a block diagram of an HGW according to an embodiment of the present invention.

The HGW includes a controller 1700, a memory 1702, a receiver 1704, and a transmitter 1706.

The controller 1700 controls the memory 1702 to automatically back up content, upon request of a mobile terminal or according to a setting of the mobile terminal. The controller 1700 searches for Sync. devices and transmits the backup content to the detected Sync. devices. The controller 1700 performs operations for the mobile terminal and controls the memory 1702, the receiver 1704, and the transmitter 1706 according to embodiments of the present invention.

The memory device 1702 backs up content according to embodiments of the present invention.

The receiver 1704 receives a backup request message from the mobile terminal. The transmitter 1706 transmits a backup complete message in response to the backup request message to the mobile terminal.

FIG. 18 is a block diagram of a mobile terminal according to an embodiment of the present invention.

The mobile terminal includes a controller 1800, a memory 1802, a receiver 1804, and a transmitter 1806.

The controller 1800 transmits a backup request message requesting backup of generated content to an HGW of a home network system.

The memory 1802 stores generated content and user-edited content.

The transmitter 1806 transmits the backup request message requesting content backup to the HGW.

The receiver 1804 receives a backup complete message in response to the backup request message from the HGW. In addition, the receiver 1804 may receive content from an external server free of charge or on payment.

In another embodiment of the present invention, a method for defining an exception rule and a keeping rule for content backup is provided. The following description is given with the appreciation that "content is excluded from backup" means that content is an exception to backup, restricted from backup, or separated out for no backup.

Figure 19:
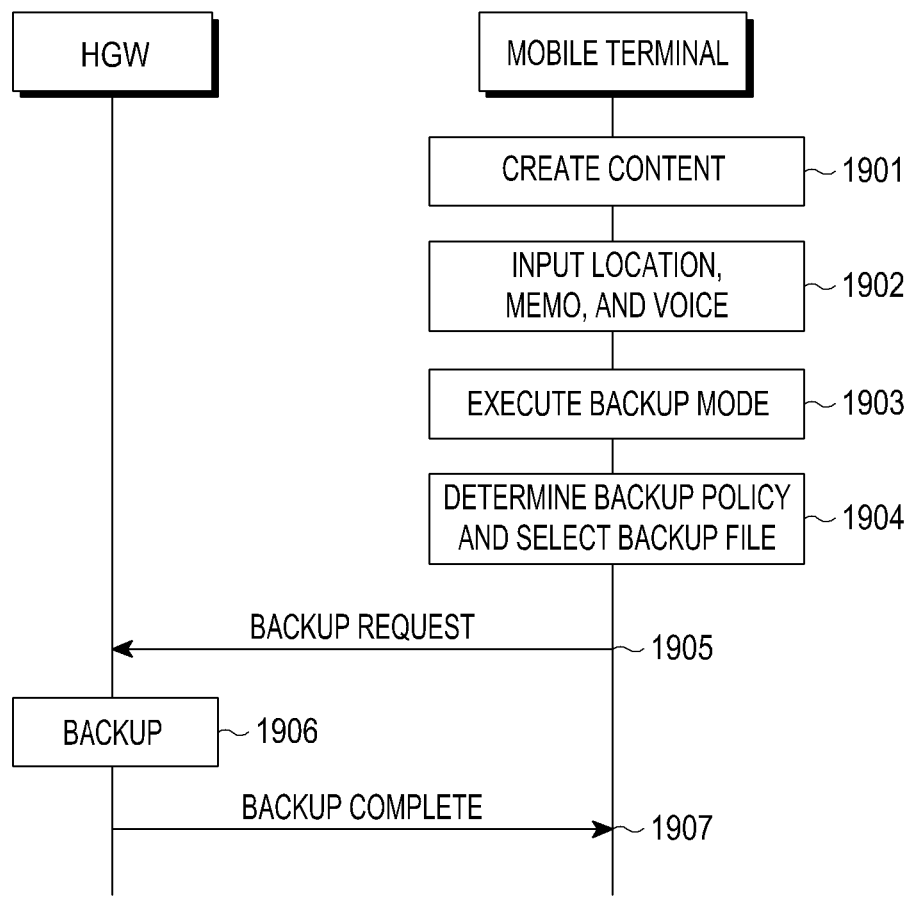
FIG. 19 is a flowchart illustrating a privacy protection method during backup according to another embodiment of the present invention.

FIG. 19 is a flowchart illustrating a privacy protection method during backup according to another embodiment of the present invention.

In the present invention, content may include music, pictures, video, and the like. In another embodiment of the present invention, a mobile terminal generates content in operation 1901. The content may be a picture or video captured by the mobile terminal, content downloaded from a server free of charge or on payment, content edited by the mobile terminal, material captured by the mobile terminal, or material updated by the mobile terminal, such as a phonebook or an address.

In the presence of information related to the generated content, such as the location of a user, voice, a memo, and the like during the content generation in operation 1902, the mobile terminal may use the information in a backup exception policy to protect privacy in content backup. In an applicable embodiment, when content is generated, the content may be input together with location information included in content information or a specific location indicated on a map. In an applicable embodiment, the content may be input with a memo written on the front or rear of the content. In an applicable embodiment, the content may be input along with voice.

When backup mode is executed by the user or automatically, the mobile terminal executes the backup mode in operation 1903. In an applicable embodiment, the backup mode may be executed by installing and executing a specific application in the mobile terminal. In an applicable embodiment, the backup mode may be an already configured function in the mobile terminal.

Upon execution of the backup mode, the mobile terminal determines content as a backup exception according to the user's intent (or a predetermined policy or a user selection) in operation 1904. The mobile terminal excludes content from backup based on the information stored in operation 1902. In an applicable embodiment, content generated at a specific location or content corresponding to a user-set specific location may be excluded from backup. In an applicable embodiment, content may be excluded from backup based on a memo written on the content. That is, content related to a family, a lover, or the user may be separated out based on a memory input along with the content. In an applicable embodiment, content may be excluded from backup based on voice information input together with the content. Voice stored with content during content generation is interpreted and the content is excluded and separated out. In an applicable embodiment, content may be stored in the HGW and in the server during backup in the same manner.

Figure 20:
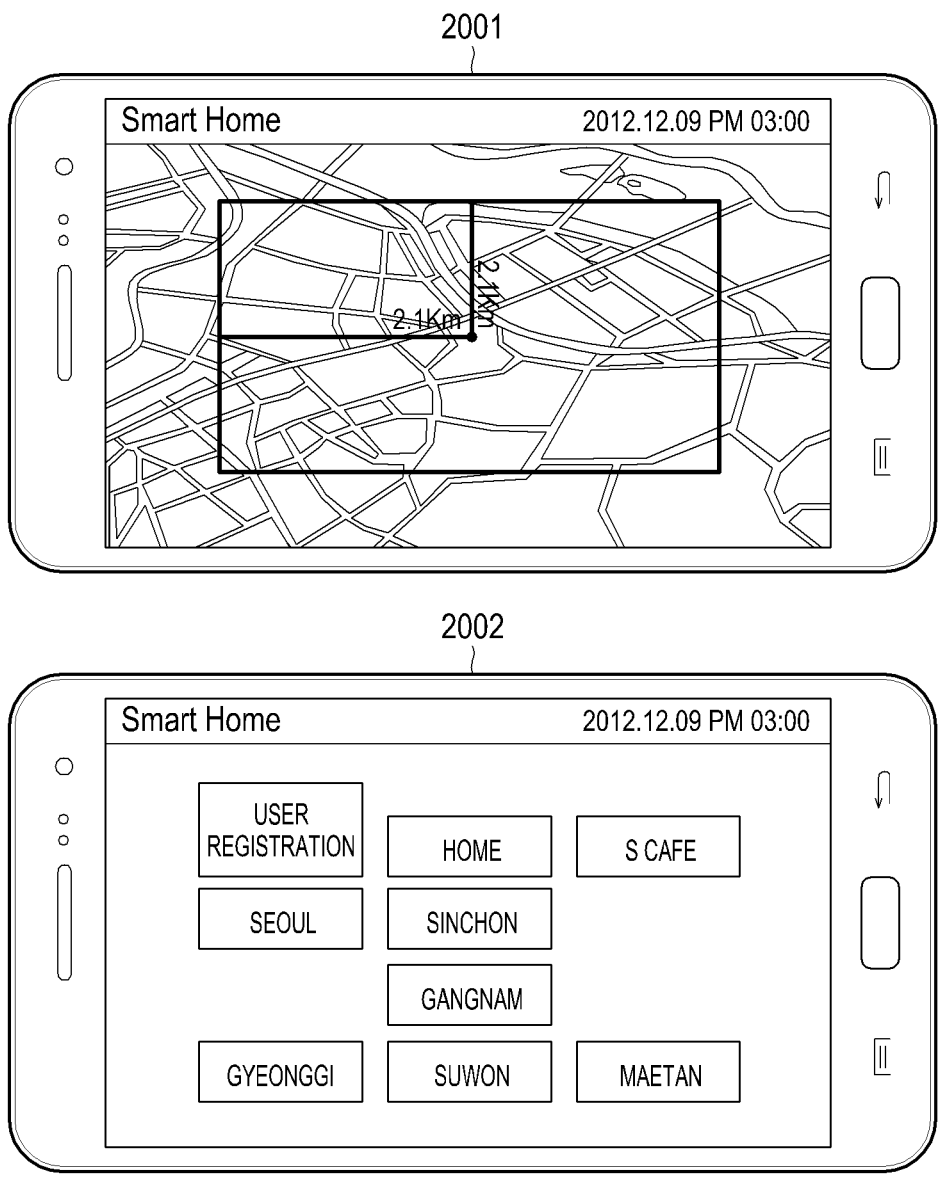
FIG. 20 illustrates a user interface referred to for describing location setting for backup exception according to another embodiment of the present invention.

FIG. 20 illustrates a UI for location setting for backup exception according to another embodiment of the present invention.

Reference numeral 2001 denotes a method for marking a region on a map by a user, for setting a backup exception.

The user may set a region by detecting a current location or a specific location with a GPS, or exclude a specific region from content backup.

Reference numeral 2002 denotes a method for excluding content backup using a specific name. A specific region may be excluded from content backup using Point Of Interest (POI) information of a map or a specific location.

Figure 21:
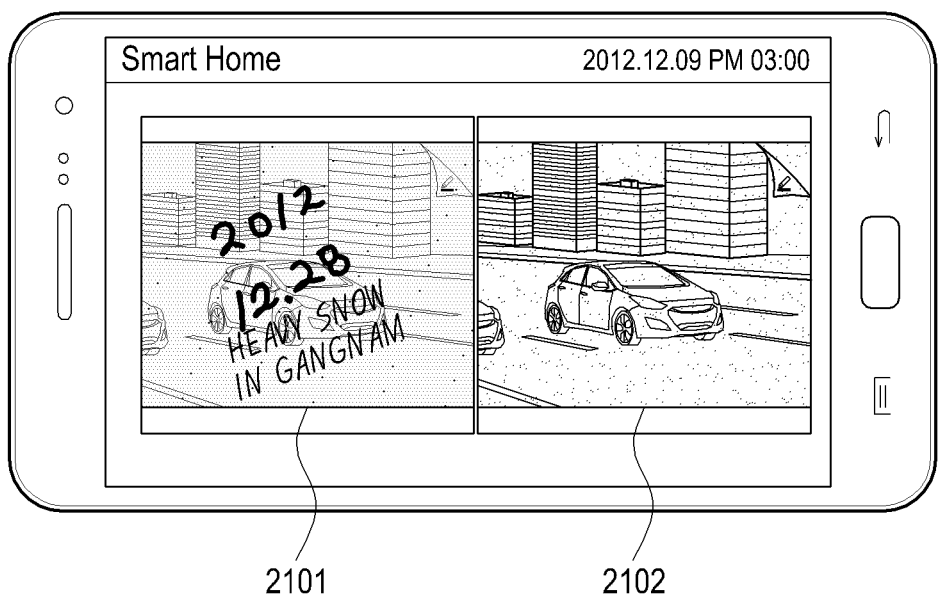
FIG. 21 illustrates a user interface referred to for describing content memo setting for backup exception according to another embodiment of the present invention.

FIG. 21 illustrates a UI for content memo setting for backup exception according to another embodiment of the present invention.

A mobile terminal may receive at least one touch input (e.g., Heavy Snow in Gangnam, Dec. 28, 2012) through a user's body (e.g., a finger) or a touch input unit (e.g., a stylus pen, an electronic pen, or the like) and store the received touch input. A key input as well as the touch input is available.

In an applicable embodiment, content including a specific location or a specific word may be excluded from backup by analyzing a location (e.g., Gangnam), a date (e.g., Dec. 28, 2012), and information (e.g., heavy snow) in user-generated content based on a memo written on the content, as indicated reference numeral 2101. For example, information related to a latest captured picture may be written in a partial area of the picture, on the rear (or front) of the picture, or a separate memo area and the picture may be excluded from backup or stored in a separate memory area (e.g., a photo folder or the like) by analyzing the input information.

In an applicable embodiment, a specific location, date, and information are detected as indicated by reference numeral 2102. Upon detection of content corresponding to the intended location, date, and information, the content may be excluded from backup.

Figure 22:
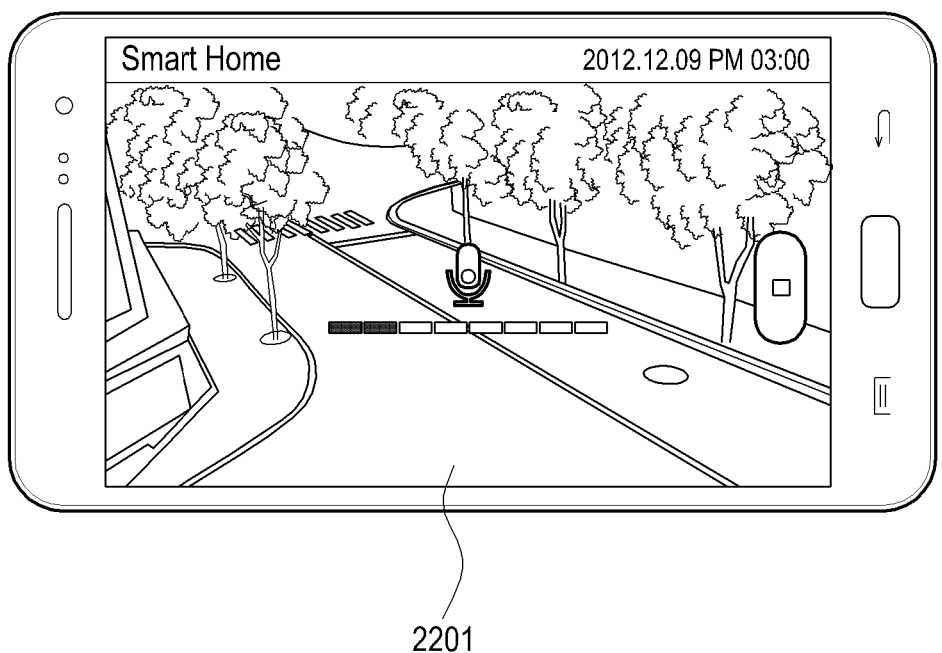
FIG. 22 illustrates a user interface referred to for describing voice storing and setting in content, for backup exception according to another embodiment of the present invention.

FIG. 22 illustrates a UI referred to for describing voice input together with content, in relation to privacy protection during content backup in a home network system according to another embodiment of the present invention.

If voice is recorded along with user-generated content as indicated by reference numeral 2201, content including a predetermined location, date, and information or content including a predetermined word may be excluded from backup by analyzing voice stored together with the content. For example, a recent specific terminal may record sound (voice or ambient sound) simultaneously with capturing a picture. Picture content may be excluded from backup or stored in a separate memory area (e.g., a photo folder or the like) by analyzing sound recorded with the picture content.

As is apparent from the above description, the present invention can automatically back up content generated from a mobile terminal, a camera, or the like in a home network system.

The present invention enables a user to check content generated from a mobile terminal, a camera, or the like in all home devices connected to an HGW.

The present invention enables family members to view new content.

The present invention can protect privacy according to a user-set policy.

Configuration, storing, and management of content in a home network system according to embodiments of the present invention may be implemented in hardware, software, or a combination of them. File data and/or software may be stored in a volatile or non-volatile storage device such as a ROM irrespective of deletable or rewritable, a memory such as a RAM<a memory chip, a device, or an Integrated Circuit (IC), or a storage medium that is optically or magnetically writable and readable by a machine (e.g., a computer), such as a Compact Disk (CD), a Digital Versatile Disk (DVD), a magnetic disk, or a magnetic tape.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A content backup method by a home gateway in a home network system, the method comprising:
   receiving, by the home gateway, from a mobile terminal, a control command requesting backup of content generated in the mobile terminal;
   backing up, by the home gateway, first content among the content generated in the mobile terminal to a storage of the home gateway in response to the control command;
   transmitting, by the home gateway, to the mobile terminal, a backup complete message indicating completion of the backing up of the first content to the storage of the home gateway;
   upon receiving a reproduction request message for reproducing the first content backed up to the storage of the home gateway from the mobile terminal,
      searching, by the home gateway, a plurality of home devices which are set as synchronized devices, and
      detecting a home device which is set as synchronized with the mobile terminal from the plurality of home devices which are set as the synchronized devices; and
   in response to detecting the home device set as synchronized with the mobile terminal, transmitting, by the home gateway, the first content backed up to the storage of the home gateway to the home device belonging to the home network system for reproduction of the first content by the home device,
   wherein second content among the content generated in the mobile terminal is excluded from backup, by the mobile terminal, based on information related to the second content being generated at a specific time or a specific place as a backup exception which is set through a user interface of the mobile terminal.

2. The method of claim 1, wherein the first content or the second content is acquired by capturing a picture or a video in the mobile terminal.

3. The method of claim 1, wherein the first content or the second content is downloaded from a specific server free of charge or on payment in the mobile terminal.

4. The method of claim 1, further comprising:
   setting up a communication network among a plurality of communication networks for communicating with the home device synchronized with the mobile terminal based on a location of the home device in the home network.

5. A content backup apparatus of a home gateway in a home network system, the apparatus comprising:
   communication circuitry;
   a memory; and
   a processor configured to:
      receive, from a mobile terminal, a control command requesting backup of content generated in the mobile terminal using the communication circuitry;
      back up first content among the content generated in the mobile terminal to the memory in response to the control command;

upon receiving a reproduction request message for reproducing the first content backed up to the memory to a home device from the mobile terminal, search, by the home gateway, a plurality of home devices which are set as synchronized devices, and detect the home device which is set as synchronized with the mobile terminal from the plurality of home devices which are set as the synchronized devices;

in response to detecting the home device set as synchronized with the mobile terminal, transmit the first content backed up to the memory to the home device belonging to the home network system for reproduction of the first content by the home device; and transmit, to the mobile terminal, a backup complete message indicating completion of the backup of the first content using the communication circuitry, wherein second content among the content generated in the mobile terminal is excluded from backup, by the mobile terminal, based on information related to the second content being generated at a specific time or a specific place as a backup exception which is set through a user interface of the mobile terminal.

6. The apparatus of claim 5, wherein the first content or the second content is acquired by capturing a picture or a video in the mobile terminal.

7. The apparatus of claim 5, wherein the first content or the second content is downloaded from a specific server free of charge or on payment in the mobile terminal.

8. The apparatus of claim 5, wherein a communication network among a plurality of communication networks for communicating with the home device synchronized with the mobile terminal is setup based on a location of the home device in the home network by the home gateway.

9. A content backup method by a mobile terminal in a home network system, the method comprising:

transmitting a control command requesting backup of content to a home gateway;

transmitting a first content among the content generated in the mobile terminal to a storage of the home gateway in response to the control command;

receiving from the home gateway a backup complete message indicating completion of backup of first content to a storage of the home gateway; and transmitting a reproduction request message for reproducing the first content backed up to the storage of the home gateway to the home gateway, wherein second content among the content generated in the mobile terminal is excluded from backup, by the mobile terminal, based on information related to the second content being generated at a specific time or a specific place as a backup exception which is set through a user interface of the mobile terminal, wherein, upon receiving the reproduction request message, the first content backed up to the storage of the home gateway is transmitted to a home device belonging to the home network system by the home gateway for reproduction of the first content by the home device when a plurality of home devices which are set as synchronized devices are searched by the home gateway and the home device set as synchronized with the mobile terminal among the plurality of home devices set as the synchronized devices is discovered by the home gateway.

10. The method of claim 9, wherein the first content or the second content is acquired by capturing a picture or a video in the mobile terminal.

11. The method of claim 9, wherein the first content or the second content is downloaded from a specific server free of charge or on payment in the mobile terminal.

12. The method of claim 9, wherein a communication network among a plurality of communication networks for communicating with the home device synchronized with the mobile terminal is setup based on a location of the home device in the home network by the home gateway.

13. A content backup apparatus of a mobile terminal in a home network system, the apparatus comprising:

a transmitter configured to transmit a control command requesting backup of the generated first content to a home gateway;

a receiver; and a controller configured to:

transmit, via the transmitter, a control command requesting backup of content to a home gateway, transmit, via the transmitter, first content among content generated in the mobile terminal to a storage of the home gateway in response to the control command, and exclude second content among content generated in the mobile terminal from backup based on information related to the second content being generated at a specific time or a specific place as a backup exception which is set through a user interface of the mobile terminal, wherein, upon receiving reproduction request message for reproducing the first content backed up to the storage of the home gateway, the first content backed up to the storage of the home gateway is transmitted to a home device belonging to the home network system by the home gateway for reproduction of the first content by the home device when a plurality of home devices which are set as synchronized devices are searched by the home gateway and the home device set as synchronized with the mobile terminal among the plurality of home devices set as the synchronized devices is discovered by the home gateway.

14. The apparatus of claim 13, wherein the first content or the second content is acquired by capturing a picture or a video in the mobile terminal.

15. The apparatus of claim 13, wherein the first content or the second content is downloaded from a specific server free of charge or on payment in the mobile terminal.

16. The apparatus of claim 13, wherein a communication network among a plurality of communication networks for communicating with the home device synchronized with the mobile terminal is setup based on a location of the home device in the home network by the home gateway.

* * * * *